United States Patent
Haraguchi (10) Patent No.: US 6,862,041 B2
(45) Date of Patent: Mar. 1, 2005

(54) CIRCUIT FOR PROCESSING CHARGE DETECTING SIGNAL HAVING FETS WITH COMMONLY CONNECTED GATES

(75) Inventor: Yoshizumi Haraguchi, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 815 days.

(21) Appl. No.: 09/768,589

(22) Filed: Jan. 25, 2001

(65) Prior Publication Data

US 2001/0050714 A1 Dec. 13, 2001

(30) Foreign Application Priority Data

Jan. 27, 2000 (JP) ........................................ 2000-019198

(51) Int. Cl.⁷ ............................ H04N 9/64; H04N 9/83; H04N 3/14; H01L 27/148; H01L 29/768
(52) U.S. Cl. ..................... 348/311; 348/250; 257/229; 257/239
(58) Field of Search ............................. 377/57, 58, 59, 377/60, 61, 62, 63; 348/241, 243, 250, 311, 222.1; 358/443; 257/229, 231, 234, 239; 250/208.1

(56) References Cited

U.S. PATENT DOCUMENTS 5,033,068 A * 7/1991 Imai ............................ 377/60
5,536,956 A * 7/1996 Kawamoto et al. ......... 257/239
6,243,434 B1 * 6/2001 Hynecek ....................... 377/60
6,437,378 B1 * 8/2002 Park ............................. 257/241
6,465,819 B2 * 10/2002 Furumiya .................... 257/215

FOREIGN PATENT DOCUMENTS

| JP | 05136396 A | * 6/1993 | ......... H01L/27/148 |
| JP | 8-186765 | 7/1996 | |
| JP | 8-306908 | 11/1996 | |
| JP | 9-168119 | 6/1997 | |

* cited by examiner

Primary Examiner—Wendy R. Garber
Assistant Examiner—Justin Misleh
(74) Attorney, Agent, or Firm—Young & Thompson (57) ABSTRACT

A circuit for processing charge detecting signals transferred to a floating diffusion amplifier from a charge coupled device includes a first node connected to the floating diffusion amplifier; a first enhancement type FET connected in series between a first fixed-voltage supply line for supplying a first fixed voltage and an output terminal, where the first enhancement type FET has a first gate connected to the first node; and a second enhancement type FET connected in series between a second fixed-voltage supply line for supplying a second fixed voltage and the output terminal, where the second enhancement type FET has a second gate supplied with a third fixed voltage which is different in potential from the second fixed voltage.

6 Claims, 8 Drawing Sheets

CIRCUIT FOR PROCESSING CHARGE DETECTING SIGNAL HAVING FETS WITH COMMONLY CONNECTED GATES

BACKGROUND OF THE INVENTION

The present invention relates to a charge detecting signal processing circuit, and more particularly to a charge detecting signal processing circuit utilizing a source-follower circuit.

In recent years, a charge coupled device has widely been used to various devices and machines such as digital cameras, facsimile machines and copy machines. The requirement for improvement in characteristics and performances of the charge coupled device for improvements in the image quality has been on the increase. In order to improve the image quality, it is effective to reduce a dark random noise of the charge coupled device. The dark noise means signal variations which cause variations in level of the same pixel for individual signals on individual pixel lines when no light is irradiated onto an image sensor of the charge coupled device. One factor causing the dark noise is a thermal noise which is generated from an output buffer provided in the charge coupled device. The thermal noise is due to a thermal motion at random of charges. The thermal noise has a flat frequency spectrum which has a contact level over entire frequency ranges.

Figure 1:
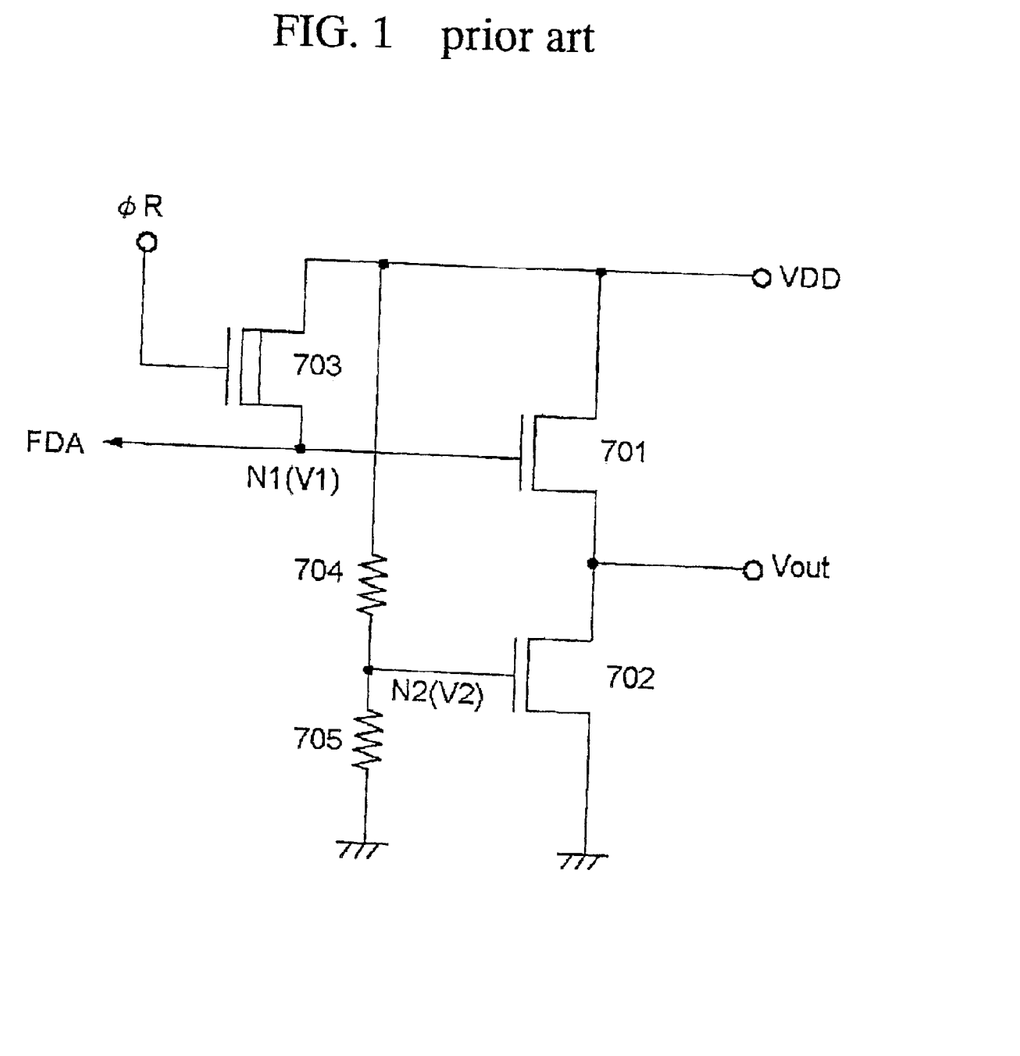
FIG. 1 is a circuit diagram illustrative of a first conventional source-follower serving as an output buffer in a charge coupled device.

A source-follower circuit is provided in the charge coupled device, wherein the source-follower circuit serves as the output buffer which may generate the thermal noise. FIG. 1 is a circuit diagram illustrative of a first conventional source-follower serving as an output buffer in a charge coupled device.

The first conventional source-follower has a reset plus terminal $\phi$ R, and an output terminal Vout. The first conventional source-follower is connected between a power line VDD and a ground line. The first conventional source-follower has a series connection of a first enhancement type n-channel MOS field effect transistor 701 and a second enhancement type n-channel MOS field effect transistor 702 between the power line and the ground line. The output terminal Vout is connected to an intermediate point between the first enhancement type n-channel MOS field effect transistor 701 and the second enhancement type n-channel MOS field effect transistor 702, so that the first enhancement type n-channel MOS field effect transistor 701 is connected in series between the power line VDD and the output terminal Vout, whilst the second enhancement type n-channel MOS field effect transistor 702 is connected in series between the output terminal Vout and the ground line. The first enhancement type n-channel MOS field effect transistor 701 has a gate connected to a first node N1 which is further connected to a floating diffusion amplifier FDA. The second enhancement type n-channel MOS field effect transistor 702 has a gate connected to a second node N2. Further, the first conventional source-follower has a series connection of a first resistance 704 and a second resistance 705 between the power line VDD and the ground line. The first resistance 704 is connected in series between the power line VDD and the second node N2, whilst the second resistance 705 is connected in series between the second node N2 and the ground line. The first resistance 704 and the second resistance 705 form a voltage dividing circuit, so that the second node N2 has a second potential V2. A depletion type n-channel MOS field effect transistor 703 is connected in series between the first node NI and the power line VDD.

The depletion type n-channel MOS field effect transistor 703 has a gate connected to a reset plus terminal, into which a reset plus $\phi$ R is inputted. A charge transferred to the floating diffusion amplifier FDA is reset upon application of the reset pulse $\phi$ R to the gate of the depletion type n-channel MOS field effect transistor 703. The second enhancement type n-channel MOS field effect transistor 702 serves as a current source and also the voltage dividing circuit is provided for controlling the current and the off-set voltage of the source follower circuit. The thermal noise is generated by the voltage dividing circuit. The thermal noise may be inputted into the gate of the second enhancement type n-channel MOS field effect transistor 702, thereby increasing random noises at the output terminal Vout of the source follower circuit. The first enhancement type n-channel MOS field effect transistor 701 may be considered to be the driver transistor, whilst the second enhancement type n-channel MOS field effect transistor 702 may be considered to be the load transistor.

The thermal noises appearing at the output terminal Vout of the source follower circuit may be classified into the following three noises. The first type thermal noise (Vn1) is generated from the n-channel MOS field effect transistors in the source-follower circuit. The second type thermal noise (Vn2) appears at the output terminal Vout of the source-follower circuit upon input of a noise into the gate of the first enhancement type n-channel MOS field effect transistor 701 from the floating diffusion amplifier FDA. The third type thermal noise (Vn3) appears at the output terminal Vout of the source-follower circuit upon input of a noise into the gate of the second enhancement type n-channel MOS field effect transistor 702 from the second node "N2" as the output of the voltage dividing circuit. The first, second and third noises are caused from independent noise sources from each other. A noise voltage Vno caused by the thermal noise appearing at the output terminal of the source follower circuit is given by:

$$Vno=\sqrt{\{(Vn1)^2+(Vn2)^2+(Vn3)^2\}} \quad (1)$$

where Vn1 is the first type thermal noise, Vn2 is the second type thermal noise, and Vn3 is the third type thermal noise. The first type thermal noise Vn1 is the noise generated from the source-follower circuit. The second type thermal noise Vn2 is the noise inputted into the source-follower circuit. Those noises are not directly relevant to the issue of the present invention.

There will hereinafter be considered the thermal noise voltage Vno2 supplied from the gate of the second enhancement type n-channel MOS field effect transistor 702. The thermal noise generated by the resistance is given by:

$$Vn=\sqrt{(4kTR\Delta f)} \quad (2)$$

where k is the Boltzmann's contact, T is the absolute temperature, R is the resistance value and $\Delta f$ is the noise band width. It is assumed that the first resistance 704 has a first resistance value R1 and the second resistance 705 has a second resistance value R2. A resistance between the power voltage line VDD and the second node N2 as the output terminal of the voltage dividing circuit is a parallel resistance to the first resistance 704. A resistance between the ground line GND and the second node N2 as the output terminal of the voltage dividing circuit is a parallel resistance to the second resistance 705. A composite resistance value R is given by:

$$R=(R1 \times R2)/(R1+R2) \quad (3)$$

The above third equation (3) is incorporated into the above second equation (2) to obtain the thermal noise voltage Vno2 which is generated from the voltage dividing circuit, wherein the thermal noise voltage Vno2 is given by:

$$Vno2 = \sqrt{[4kT\{(R1 \times R2)/(R1+R2)\}\Delta f]} \quad (4)$$

Figure 2:
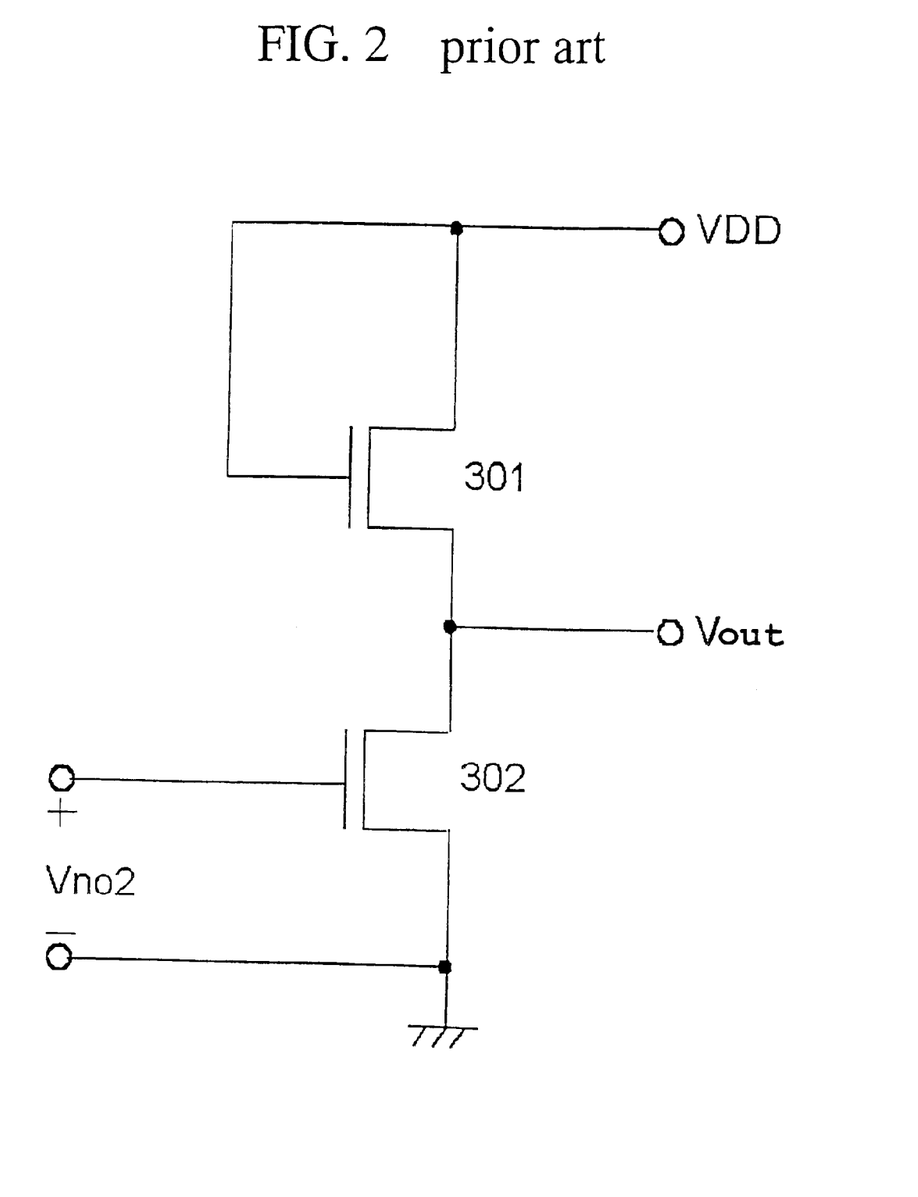
FIG. 2 is a circuit diagram illustrative of a modified conventional source-follower circuit from the above first conventional source-follower circuit, wherein the noises are inputted into the gate of the second enhancement type n-channel MOS field effect transistor.

The third type thermal noise Vn3 appearing at the output terminal Vout of the source follower circuit is caused by the noise voltage Vno2 which is generated from the voltage dividing circuit. FIG. 2 is a circuit diagram illustrative of a modified conventional source-follower circuit from the above first conventional source-follower circuit, wherein the noises are inputted into the gate of the second enhancement type n-channel MOS field effect transistor. A first enhancement type n-channel MOS field effect transistor 301 corresponds to the above first enhancement type n-channel MOS field effect transistor 701. A second enhancement type n-channel MOS field effect transistor 302 corresponds to the above second enhancement type n-channel MOS field effect transistor 702. The first enhancement type n-channel MOS field effect transistor 301 and the second enhancement type n-channel MOS field effect transistor 302 are connected in series between the power voltage line VDD and the ground line GND. The first enhancement type n-channel MOS field effect transistor 301 is connected in series between the power voltage line VDD and the output terminal Vout. The second enhancement type n-channel MOS field effect transistor 302 is connected in series between the ground line GND and the output terminal Vout. The gate and drain of the first enhancement type n-channel MOS field effect transistor 301 is connected to the power voltage line VDD, wherein it is considered that the reset transistor turns ON and the gate of the first enhancement type n-channel MOS field effect transistor 301 has the same potential as the power voltage line VDD. The source of the first enhancement type n-channel MOS field effect transistor 301 is connected to the source follower output terminal Vout. The gate of the second enhancement type n-channel MOS field effect transistor 302 is connected to the second node. The drain of the second enhancement type n-channel MOS field effect transistor 302 is connected to the source follower output terminal Vout. The source of the second enhancement type n-channel MOS field effect transistor 302 is connected to the ground line. A noise inputted into the gate of the first enhancement type n-channel MOS field effect transistor 301 is ignored, whilst another noise inputted into the gate of the second enhancement type n-channel MOS field effect transistor 302 is considered. This circuit configuration is the same as an n-channel MOS inverter circuit. The noise voltage Vn3 appearing at the source-follower output terminal Vout is given by a product of the above second thermal noise voltage Vno2 of the dividing circuit and a gain of the n-channel MOS inverter. The n-channel MOS inverter shown in FIG. 2 has a gain Av. Assuming that a transmission conductance of the n-channel MOS field effect transistor is sufficiently larger than a transmission conductance caused by a substrate bias and also than a channel conductance caused by a channel modification effect, then the gain Va of the n-channel MOA inverter is given by:

$$Av = -(gm2/gm1) \quad (5)$$

where "gm1" is the transmission conductance of the first enhancement type n-channel MOS field effect transistor 301, and "gm2" is the transmission conductance of the second enhancement type n-channel MOS field effect transistor 302. The noise voltage Vn3 appearing at the source follower output terminal Vout and being caused by the thermal noise voltage Vno2 of the dividing circuit is given by:

$$Vn3 = \sqrt{[\{-(gm2/gm1)Vno2\}^2]} \quad (6)$$

Figure 3:
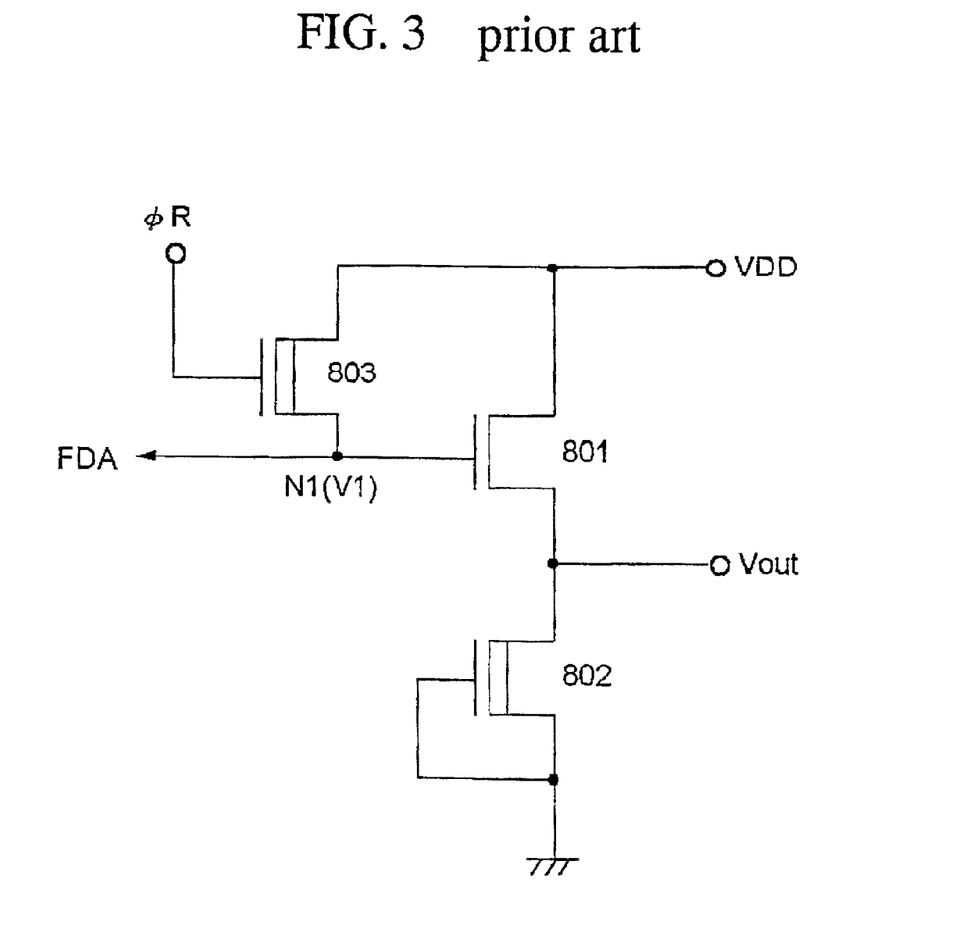
FIG. 3 is a circuit diagram illustrative of a second conventional source-follower circuit.

It is effective for reducing the thermal noise caused by the dividing circuit to increase "gm1" and decrease "gm2". It is possible to reduce the transmission conductance "gm2" of the second enhancement type n-channel MOS field effect transistor 302 in the load side. However, the increase in the transmission conductance "gm1" of the first enhancement type n-channel MOS field effect transistor 301 in the driver side results in deterioration in the detective capacity of the floating diffusion amplifier, for which reason it is difficult to sufficiently increase the transmission conductance "gm1" of the first enhancement type n-channel MOS field effect transistor 301. It is thus possible that the thermal noise caused by the dividing circuit is relatively large in ratio to a total noise of the source-follower circuit. There has been used a second conventional source-follower circuit, wherein a gate of a transistor in a load side is free from an input of noises. FIG. 3 is a circuit diagram illustrative of a second conventional source-follower circuit. The second conventional source-follower circuit has a reset plus terminal φ R, and an output terminal Vout. The second conventional source-follower is connected between a power line VDD and a ground line. The second conventional source-follower has a series connection of a first enhancement type n-channel MOS field effect transistor 801 and a second enhancement type n-channel MOS field effect transistor 802 between the power line and the ground line. The output terminal Vout is connected to an intermediate point between the first enhancement type n-channel MOS field effect transistor 801 and the second enhancement type n-channel MOS field effect transistor 802, so that the first enhancement type n-channel MOS field effect transistor 801 is connected in series between the power line VDD and the output terminal Vout, whilst the second enhancement type n-channel MOS field effect transistor 802 is connected in series between the output terminal Vout and the ground line. The first enhancement type n-channel MOS field effect transistor 801 has a gate connected to a first node N1 which is further connected to a floating diffusion amplifier FDA. The second enhancement type n-channel MOS field effect transistor 802 has a gate connected to the ground line, so that no noise is supplied to the gate of the second enhancement type n-channel MOS field effect transistor 802. Further, the second conventional source-follower has no voltage dividing circuit. A depletion type n-channel MOS field effect transistor 803 is connected in series between the first node N1 and the power line VDD. The depletion type n-channel MOS field effect transistor 803 has a gate connected to a reset plus terminal, into which a reset plus φ R is inputted. A charge transferred to the floating diffusion amplifier FDA is reset upon application of the reset pulse φ R to the gate of the depletion type n-channel MOS field effect transistor 803. Since no voltage dividing circuit is provided, no thermal noise is inputted into the gate of the second enhancement type n-channel MOS field effect transistor 802, thereby causing no random noises at the output terminal Vout of the source follower circuit. The noise appearing at the output terminal Vout of the source-follower circuit is given by subtracting Vn3 from the above equation (1). The first enhancement type n-channel MOS field effect transistor 801 may be considered to be the driver transistor, whilst the second enhancement type n-channel MOS field effect transistor 802 may be considered to be the load transistor.

The second conventional source-follower circuit utilizes the depletion type n-channel MOS field effect transistor 802 in place of the voltage dividing circuit, thereby reducing the thermal noise as compared to the first conventional source-follower circuit. Variation in threshold voltage of the depletion type field effect transistor caused by the diffusion process is larger by about five times than variation in threshold voltage of the enhancement type field effect transistor caused by the diffusion process. The variation in threshold voltage of the depletion type field effect transistor caused by the diffusion process may be in the range of −1V to +1V. As a result, the input output characteristics of the source-follower circuit may have large variations for the following reasons. In recent years, the most of the charge coupled devices uses a buried-channel charge coupled device. In order to reduce the number of the fabrication processes, the channel of the depletion type field effect transistor is formed in the same time process as the buried channel of the charge coupled device. A thermal diffusion process is carried out to form an n-well region over a p-type substrate for the purpose of forming the buried channel of the charge coupled device. If the channel of the depletion type field effect transistor is formed in the same time process as the buried channel of the charge coupled device, then such the depletion type field effect transistor is larger in threshold voltage variation than the depletion type field effect transistor formed in the normal processes for the following reasons. The process for forming the buried channel of the charge coupled device is higher in dose than the normal process for forming the channel of the depletion type field effect transistor. The process for forming the buried channel of the charge coupled device is also longer in diffusion time period than the normal process for forming the channel of the depletion type field effect transistor. The higher dose and longer diffusion time of the process for forming the buried channel of the charge coupled device cause a larger variation in impurity profile. The larger variation in impurity profile causes the larger variation in threshold voltage. The larger variation in threshold voltage causes a larger variation in input-output characteristics of the source-follower circuit.

In the above circumstances, it had been required to develop a novel circuit for processing charge detecting signals free from the above problem.

SUMMARY OF THE INVENTION

Accordingly, it is an object of the present invention to provide a novel circuit for processing charge detecting signals free from the above problems.

It is a further object of the present invention to provide a novel circuit for processing charge detecting signals, which is capable of reducing noises.

It is a still further object of the present invention to provide a novel circuit for processing charge detecting signals, which is capable of reducing variations in input-output characteristics of a source-follower circuit.

It is further more object of the present invention to provide a novel source-follower circuit for processing charge detecting signals free from the above problems.

It is moreover object of the present invention to provide a novel source-follower circuit for processing charge detecting signals, which is capable of reducing noises.

It is yet more object of the present invention to provide a novel source-follower circuit for processing charge detecting signals, which is capable of reducing variations in input-output characteristics of a source-follower circuit.

The first present invention provides a circuit for processing charge detecting signal transferred to a floating diffusion amplifier from a charge coupled device. The circuit comprises: a first node connected to the floating diffusion amplifier; a first enhancement type field effect transistor being connected in series between a first fixed-voltage supply line for supplying a first fixed voltage and an output terminal, and the first enhancement type field effect transistor having a first gate connected to the first node; and a second enhancement type field effect transistor being connected in series between a second fixed-voltage supply line for supplying a second fixed voltage and the output terminal, wherein the second enhancement type field effect transistor has a second gate supplied with a third fixed voltage which is different in potential from the second fixed voltage.

The second present invention provides a circuit for processing charge detecting signal transferred to a floating diffusion amplifier from a charge coupled device in response to a transfer gate clock signal. The circuit comprises: a first node connected to the floating diffusion amplifier; a first enhancement type field effect transistor being connected in series between a first fixed-voltage supply line for supplying a first fixed voltage and an output terminal, and the first enhancement type field effect transistor having a first gate connected to the first node; a second enhancement type field effect transistor being connected in series between a second fixed-voltage supply line for supplying a second fixed voltage and the output terminal, and the second enhancement type field effect transistor having a second gate connected to a second node; and a voltage control circuit being connected to the second node for connecting the second node to a third fixed-voltage in a first time period, in which the transfer clock signal is not supplied, and also for electrically isolating the second node from the third fixed-voltage in a second time period, in which the transfer clock signal is supplied.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DISCLOSURE OF THE INVENTION

The first present invention provides a circuit for processing charge detecting signal transferred to a floating diffusion amplifier from a charge coupled device. The circuit comprises: a first node connected to the floating diffusion amplifier; a first enhancement type field effect transistor being connected in series between a first fixed-voltage supply line for supplying a first fixed voltage and an output terminal, and the first enhancement type field effect transistor having a first gate connected to the first node; and a second enhancement type field effect transistor being connected in series between a second fixed-voltage supply line for supplying a second fixed voltage and the output terminal, wherein the second enhancement type field effect transistor has a second gate supplied with a third fixed voltage which is different in potential from the second fixed voltage.

It is preferable that the second gate of the second enhancement type field effect transistor is connected to the first fixed-voltage supply line, and the second gate is supplied with the third fixed voltage which is equal to the first fixed-voltage.

It is also preferable that the first fixed-voltage supply line comprises a power voltage line, whilst the second fixed-voltage supply line comprises a ground line.

The second present invention provides a circuit for processing charge detecting signal transferred to a floating diffusion amplifier from a charge coupled device in response to a transfer gate clock signal. The circuit comprises: a first node connected to the floating diffusion amplifier; a first enhancement type field effect transistor being connected in series between a first fixed-voltage supply line for supplying a first fixed voltage and an output terminal, and the first enhancement type field effect transistor having a first gate connected to the first node; a second enhancement type field effect transistor being connected in series between a second fixed-voltage supply line for supplying a second fixed voltage and the output terminal, and the second enhancement type field effect transistor having a second gate connected to a second node; and a voltage control circuit being connected to the second node for connecting the second node to a third fixed-voltage in a first time period, in which the transfer clock signal is not supplied, and also for electrically isolating the second node from the third fixed-voltage in a second time period, in which the transfer clock signal is supplied.

It is also preferable that the voltage control circuit includes a capacitance connected in series between the second node and the second fixed-voltage supply line for fixing the second node in potential.

It is also preferable that the voltage control circuit further includes: a voltage dividing circuit being connected in series between the first fixed-voltage supply line and the second fixed-voltage supply line; a third node connected to an output terminal of the voltage dividing circuit; and a third enhancement type field effect transistor being connected in series between the second and third nodes, and the third enhancement type field effect transistor having a gate receiving a control signal under which the voltage control circuit is operated.

It is further preferable that the control signal comprises the transfer gate clock signal.

Preferred Embodiment

First Embodiment

Figure 4:
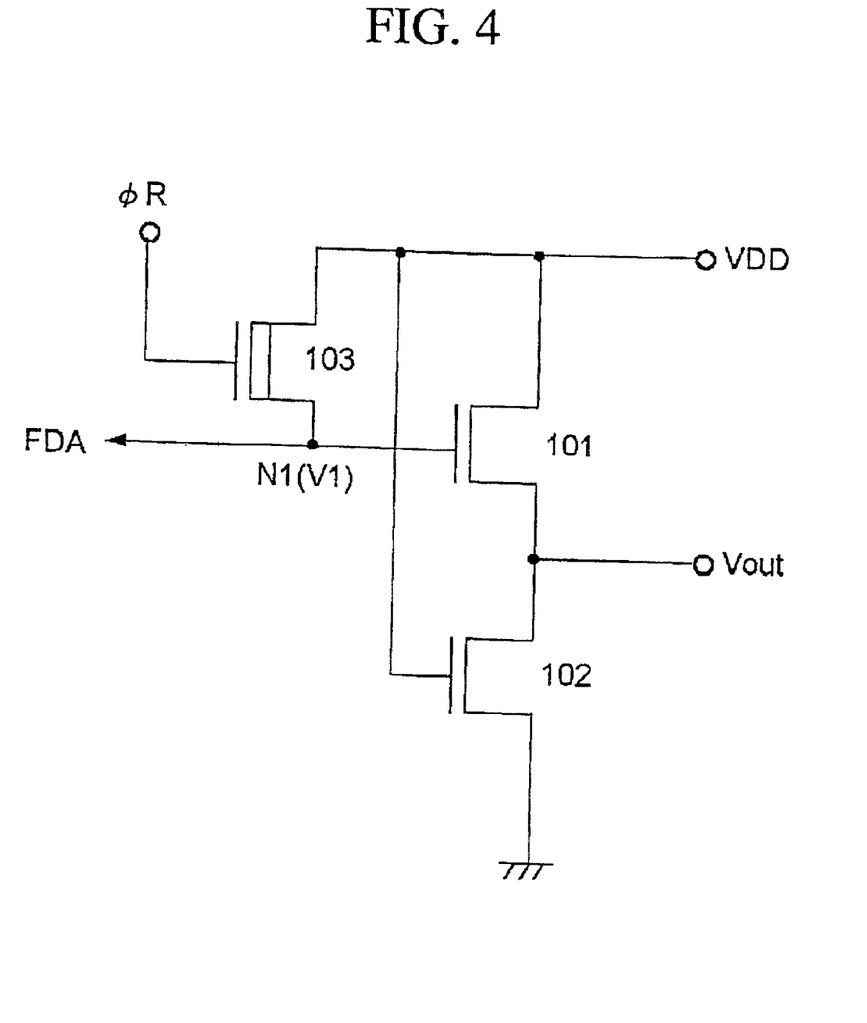
FIG. 4 is a circuit diagram illustrative of a first circuit for processing charge detecting signals in a first embodiment in accordance with the present invention.

A first embodiment according to the present invention will be described in detail with reference to the drawings. FIG. 4 is a circuit diagram illustrative of a first novel circuit for processing charge detecting signals in a first embodiment in accordance with the present invention. The first novel circuit for processing charge detecting signals comprises a source-follower circuit and a reset transistor. The source-follower circuit has an input side connected to a floating diffusion amplifier for receiving an input of a charge detecting signal from the floating diffusion amplifier. The reset transistor is operated to reset the floating diffusion amplifier. The first novel circuit for processing charge detecting signals has a reset plus terminal φ R, and an output terminal Vout. The source-follower circuit is connected between a power line VDD and a ground line. The source-follower circuit has a series connection of a first enhancement type n-channel MOS field effect transistor 101 and a second enhancement type n-channel MOS field effect transistor 102 between the power line and the ground line. The output terminal Vout is connected to an intermediate point between the first enhancement type n-channel MOS field effect transistor 101 and the second enhancement type n-channel MOS field effect transistor 102, so that the first enhancement type n-channel MOS field effect transistor 101 is connected in series between the power line VDD and the output terminal Vout, whilst the second enhancement type n-channel MOS field effect transistor 102 is connected in series between the output terminal Vout and the ground line. The first enhancement type n-channel MOS field effect transistor 101 has a gate connected to a first node N1 which is further connected to the floating diffusion amplifier FDA. The second enhancement type n-channel MOS field effect transistor 102 has a gate connected to the power line VDD. The first enhancement type n-channel MOS field effect transistor 101 serves as a driver transistor, whilst the second enhancement type n-channel MOS field effect transistor 102 serves as a load transistor. Further, the first novel circuit for processing the charge detecting signals has no voltage dividing circuit. The reset transistor comprises a depletion type n-channel MOS field effect transistor 103 which is connected in series between the first node N1 and the power line VDD. The depletion type n-channel MOS field effect transistor 103 has a gate connected to a reset plus terminal, into which a reset plus φ R is inputted. A charge transferred to and accumulated in the floating diffusion amplifier FDA is reset upon application of the reset pulse φ R to the gate of the depletion type n-channel MOS field effect transistor 103.

Upon input of charge into the floating diffusion amplifier, a variation in potential of the first node N1 is caused. This variation in potential of the first node N1 causes a variation in potential of the gate of the first enhancement type n-channel MOS field effect transistor 101 as the driver transistor. The source-follower circuit detects variation in potential. The depletion type n-channel MOS field effect transistor 103 as the reset transistor turns ON upon application of the reset pulses φ R into the gate thereof, so as to cause the potential of the first node N1 or the floating diffusion amplifier to correspond to the power voltage VDD. An input off-set voltage of the source-follower becomes equal to the power voltage VDD.

A thermal noise voltage Vno appearing at the output terminal Vout of the source-follower circuit is given by:

$$Vno=\sqrt{(Vn1^2+Vn2^2)} \quad (7)$$

where Vn1 is the thermal noise voltage caused by a resistance component of the first and second enhancement type n-channel MOS field effect transistors 101 and 102 in the source-follower circuit, and Vn2 is the noise voltage caused by the thermal noise inputted into the first enhancement type n-channel MOS field effect transistor 101 as the driver transistor from the floating diffusion amplifier.

Figure 5:
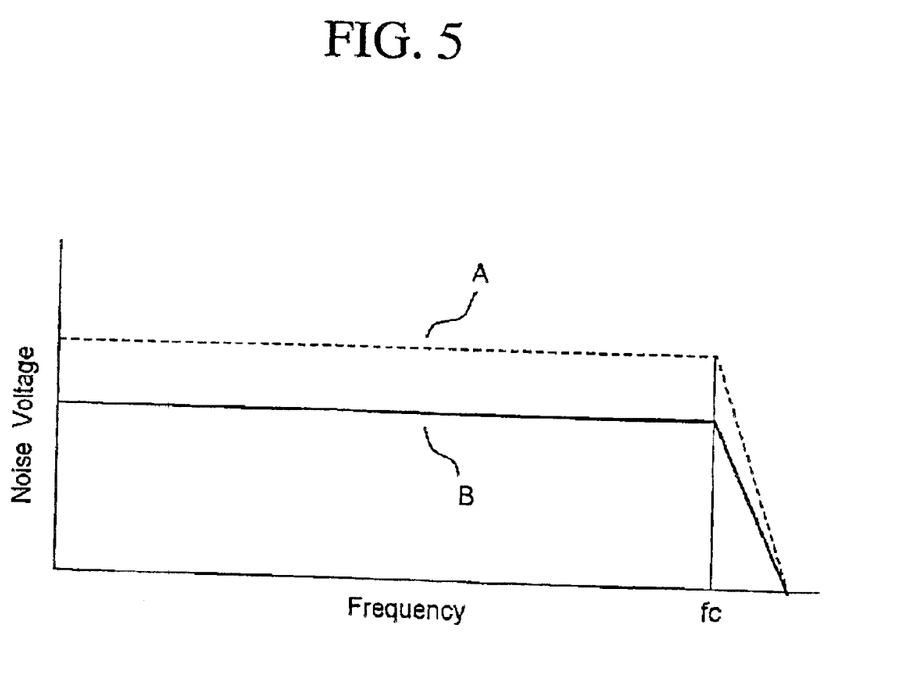
FIG. 5 is a diagram illustrative of variations of noise voltage appearing at the output terminal of the source-follower circuit over frequency.

FIG. 5 is a diagram illustrative of variations of noise voltage appearing at the output terminal of the source-follower circuit over frequency. A broken line represents the noise of the first conventional circuit, whilst a real line represents the noise of the first novel circuit. "fc" represents a cut-off frequency of the source-follower circuit. The thermal noise voltage Vno appearing at the output terminal Vout of the source-follower circuit is free of the above third noise Vn3 possessed by the first conventional circuit. The load transistor comprising the enhancement type transistor reduces the variation in threshold voltage, whereby the variation in input-output characteristics of the source-follower circuit is also reduced.

As described above, the first novel circuit for processing the charge detecting signals is free of any voltage dividing circuit. No dividing circuit consumes no current. As a result, a comsumption power s also reduced. No dividing circuit reduces a layout area or an occupied area, thereby allowing a further higher density integration.

As described above, the gate of the load transistor or the second enhancement type n-channel MOS field effect transistor 102 is directly connected to the power line VDD, for which reason it is difficult to change the characteristics and performances of the load transistor. This means it difficult to change the characteristics and performances of the source-follower circuit.

As described above, the first novel circuit for processing the charge detecting signal transferred to the floating diffusion amplifier from the charge coupled device has improvements in noise characteristics and input/output characteristics.

Second Embodiment

Figure 6:
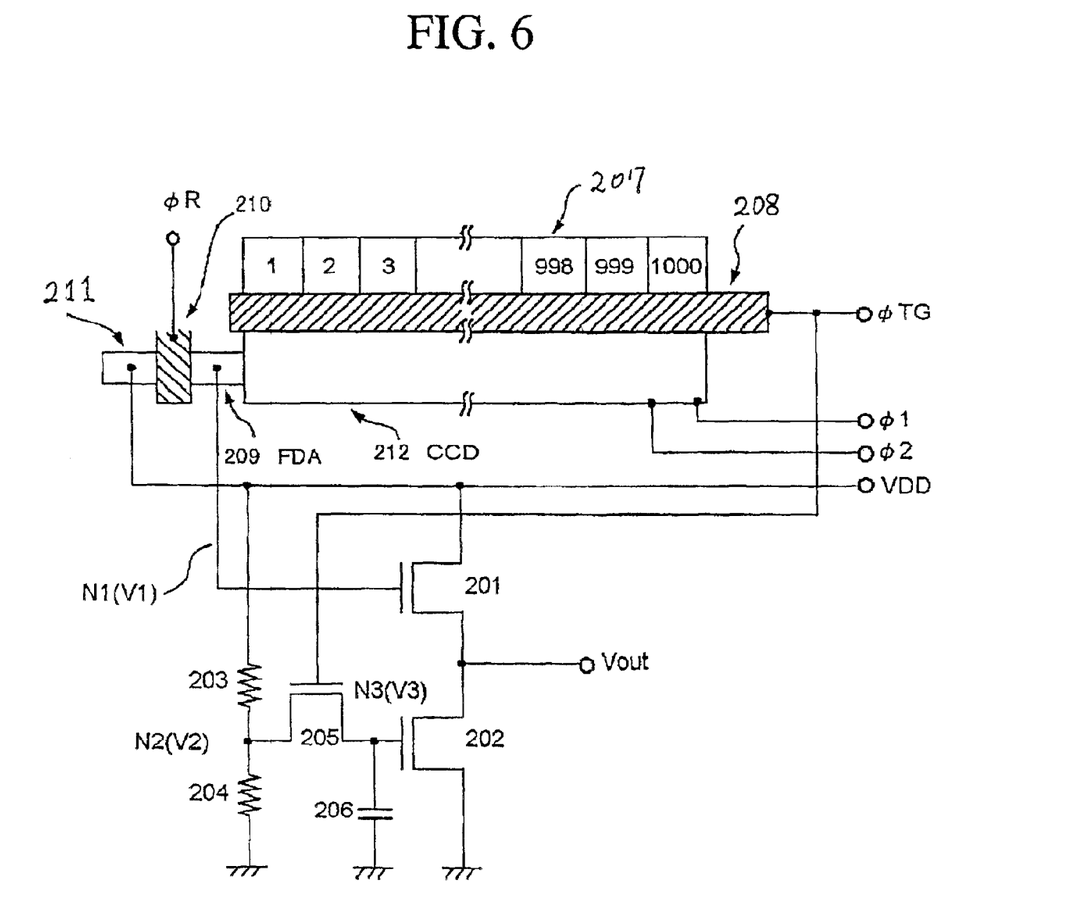
FIG. 6 is a circuit diagram illustrative of a second novel circuit for processing charge detecting signals and a charge coupled device connected to the second novel circuit in a second embodiment in accordance with the present invention.

A first embodiment according to the present invention will be described in detail with reference to the drawings. FIG. 6 is a circuit diagram illustrative of a second novel circuit for processing charge detecting signals and a charge coupled device connected to the second novel circuit in a second embodiment in accordance with the present invention. The second novel circuit for processing charge detecting signals is designed to allow changing characteristics and performances of the source-follower circuit without deteriorating noise characteristics.

The charge coupled device has a photodiode portion 207, which comprises an alignment of 1000 photodiodes, a transfer gate 208 connected with the photodiode portion 207, a charge coupled device register 212 connected with the transfer gate 208, a floating diffusion amplifier FDA 209 connected with the charge coupled device register 212, a reset gate 210 connected with the floating diffusion amplifier FDA 209, and a reset drain 211 connected with the reset gate 210. A clock pulse φ TG is inputted into the transfer gate 208. First and second driver clock pulses φ 1 and φ 2 having opposite phases to each other are inputted into the charge coupled device register 212. A reset pulse φ R is inputted into the reset gate 210. Charges are generated by the photodiode portion 207 and then transferred through the transfer gate 208 to the charge coupled device register 212. The charges are further transferred through the floating diffusion amplifier FDA 209, the reset gate 210, and the reset drain 211. A final stage of the driver clock pulses for driving the charge coupled device register is φ 2.

The second novel circuit for processing the charge detecting signals is coupled to the above charge coupled device. The second novel circuit for processing the charge detecting signals a source-follower circuit and a reset transistor. The source-follower circuit has an input side connected to the floating diffusion amplifier FDA 209 for receiving an input of a charge detecting signal from the floating diffusion amplifier FDA 209. The reset transistor is operated to reset the floating diffusion amplifier FDA 209. The second novel circuit for processing charge detecting signals has a first node N1 connected to the floating diffusion amplifier FDA 209, and an output terminal Vout. The source-follower circuit is connected between a power line VDD and a ground line. The power line VDD is connected to the reset drain 211. The source-follower circuit has a series connection of a first enhancement type n-channel MOS field effect transistor 201 and a second enhancement type n-channel MOS field effect transistor 202 between the power line and the ground line. The output terminal Vout is connected to an intermediate point between the first enhancement type n-channel MOS field effect transistor 201 and the second enhancement type n-channel MOS field effect transistor 202, so that the first enhancement type n-channel MOS field effect transistor 201 is connected in series between the power line VDD and the output terminal Vout, whilst the second enhancement type n-channel MOS field effect transistor 202 is connected in series between the output terminal Vout and the ground line. The first enhancement type n-channel MOS field effect transistor 201 has a gate connected to the first node N1 which is further connected to the floating diffusion amplifier FDA 209. The second enhancement type n-channel MOS field effect transistor 202 has a gate connected to a third node N3. A voltage dividing circuit is further provided between the power line VDD and the ground line GND. The voltage dividing circuit comprises a series connection of a first resistance 203 and a second resistance 204. The first resistance 203 is connected in series between the power line VDD and a second node N2, whilst the second resistance 204 is connected in series between the second node N2 and the ground line GND. A third enhancement type n-channel MOS field effect transistor 205 is provided which is connected in series between the second and third nodes N2 and N3. A gate of the third enhancement type n-channel MOS field effect transistor 205 receives the input of the clock pulse φ TG. A capacitor 206 is connected in series between the third node N3 and the ground line.

Figure 7:
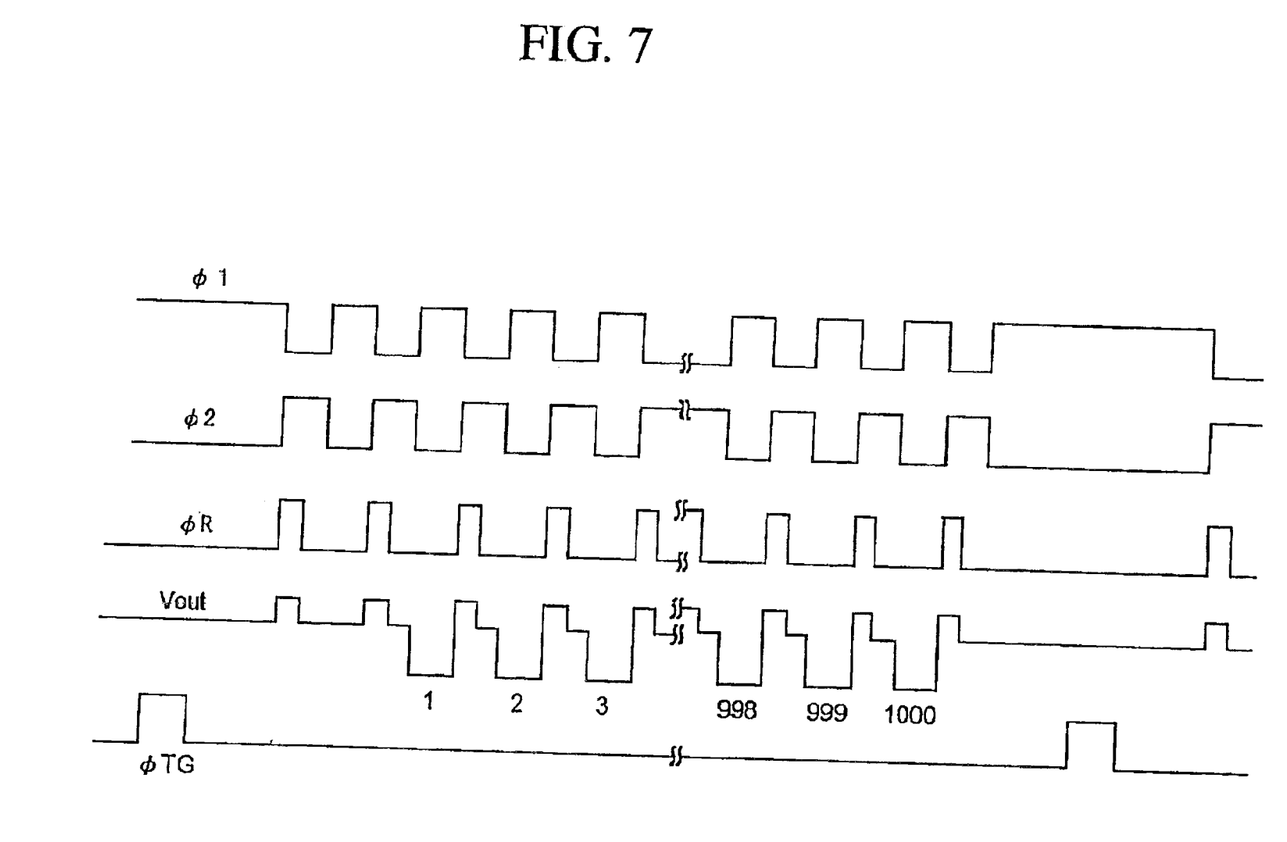
FIG. 7 is a timing chart illustrative of waveforms of clock pulses, reset pulse and output signal of the second novel circuit for processing the charge detecting signals and the charge coupled device connected thereto.

FIG. 7 is a timing chart illustrative of waveforms of clock pulses, reset pulse and output signal of the second novel circuit for processing the charge detecting signals and the charge coupled device connected thereto. As described above, the final stage of the driver clock pulse is φ 2, for which reason the charges to be transferred to the floating diffusion amplifier FDA 209 synchronizes with the fall-edge of φ 2 of the driver clock pulse. The waveform of the output signal appearing at the output terminal of the source-follower circuit is outputted in synchronizing with the fall-edge of φ 2 of the driver clock pulse. The reset gate is driven by the reset pulse φ R, whereby the potential of the floating diffusion amplifier FDA 209 is reset into the power voltage level VDD. Since the number of the photo-diodes is 1000, the output signal corresponds to 1–1000. The transfer gate driving pulse signal φ TG is to transfer charges from the photo-diodes to the charge coupled device register, for which reason the transfer gate driving pulse signal φ TG is activated in such a time period that the charge coupled device register driving pulse remains inactivated. The transfer gate driving pulse signal φ TG has a long time period which is equal to about 1000 times of the time period of the charge coupled device register driving time period.

The gate voltage V3 of the second enhancement type n-channel MOS field effect transistor 202 as the load transistor in the source-follower circuit becomes equal to the output voltage V2 from the voltage dividing circuit when the third enhancement type n-channel MOS field effect transistor 205 turns ON in response to the high level of the transfer gate driving pulse φ TG. The gate voltage V3 of the second enhancement type n-channel MOS field effect transistor 202 as the load transistor in the source-follower circuit is held by the capacitor 206 at the same output voltage level as the output voltage from the voltage dividing circuit when the third enhancement type n-channel MOS field effect transistor 205 turns OFF in response to the low level of the transfer gate driving pulse φ TG.

Figure 8:
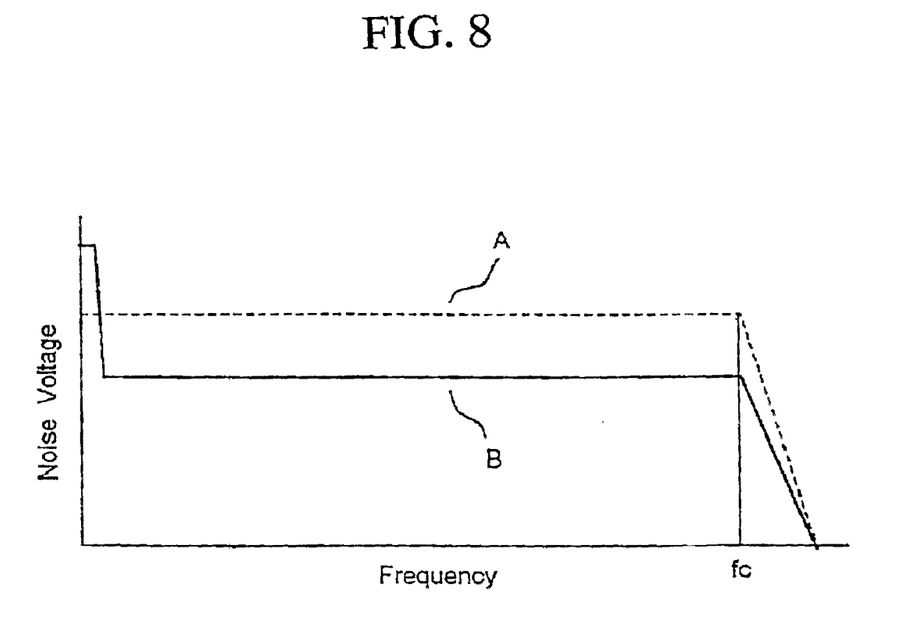
FIG. 8 is a diagram illustrative of variations of noise voltage appearing at the output terminal of the source-follower circuit over frequency.

In the time period where voltage V3 at the third node N3 is held, the gate of the second enhancement type n-channel MOS field effect transistor 202 is electrically isolated from the voltage dividing circuit, for which reason the second enhancement type n-channel MOS field effect transistor 202 is free from the thermal noise generated from the voltage dividing circuit. The voltage V3 is held by the transfer gate driving pulse φ TG, so that the noise is limited into a frequency band corresponding to not more than one half of the driving frequency band of the transfer gate driving pulse φ TG. For this reason, it is, in case, possible that a low frequency noise be increased. As can be seen from the equation (2), if the noise is limited into the low frequency band, then the thermal noise is small. The driving frequency of the clock pulse φ TG is much lower than the frequency of the output signal from the charge coupled device. For example, the driving frequency of the clock pulse φ TG is about 1/1000 of the frequency of the output signal from the charge coupled device. FIG. 8 is a diagram illustrative of variations of noise voltage appearing at the output terminal of the source-follower circuit over frequency. A broken line represents the noise of the first conventional circuit, whilst a real line represents the noise of the second novel circuit. "fc" represents a cut-off frequency of the source-follower circuit. Whereas the output terminal of the voltage dividing circuit is connected to the gate of the second enhancement type n-channel MOS field effect transistor 202, then almost no increase of the noise appears. This means it possible that the gate voltage of the second enhancement type n-channel MOS field effect transistor 202 is the range of the power voltage VDD and the ground level GND. This increases in freedoms in characteristics and performances as well as design of the source-follower circuit.

In the above second embodiment, the voltage dividing circuit comprises the series connection of the plural resistances. It is also possible as a modification that the voltage dividing circuit comprises a plurality of transistor, or capacitor. The pulse signal to be inputted into the gate of the third enhancement type n-channel MOS field effect transistor 205 may be other driving pulse than the above transfer gate driving pulse φ TG, provided that the pulse signal has a period which is integer times of the transfer gate driving pulse φ TG, and has an On-time period in the stop or inactivated time period of the charge coupled device register driving clock. It is also possible that the third enhancement type n-channel MOS field effect transistor 205 serving as a switching transistor may be replaced by a p-channel MOS field effect transistor, provided that the gate input pulse into the p-channel MOS field effect transistor is inverted.

As described above, the second novel circuit for processing the charge detecting signal transferred to the floating diffusion amplifier from the charge coupled device has improvements in noise characteristics and input/output characteristics.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A circuit for processing charge detecting signal transferred to a floating diffusion amplifier from a charge coupled device, said circuit comprising:

a first node connected to said floating diffusion amplifier;

a first enhancement type field effect transistor being connected in series between a first fixed-voltage supply line for supplying a first fixed voltage and an output terminal, and said first enhancement type field effect transistor having a first gate connected to said first node; and a second enhancement type field effect transistor being connected in series between a second fixed-voltage supply line for supplying a second fixed voltage and the output terminal, wherein said second enhancement type field effect transistor has a second gate connected to said first fixed-voltage supply line and is supplied with the first fixed voltage.

2. The circuit as claimed in claim 1, wherein said first fixed-voltage supply line comprises a power voltage line, whilst said second fixed-voltage supply line comprises a ground line.

3. A circuit for processing charge detecting signal transferred to a floating diffusion amplifier from a charge coupled device in response to a transfer gate clock signal, said circuit comprising:

a first node connected to said floating diffusion amplifier;

a first enhancement type field effect transistor being connected in series between a first fixed-voltage supply line for supplying a first fixed voltage and an output terminal, and said first enhancement type field effect transistor having a first gate connected to said first node;

a second enhancement type field effect transistor being connected in series between a second fixed-voltage supply line for supplying a second fixed voltage and the output terminal, and said second enhancement type field effect transistor having a second gate connected to a second node; and a voltage control circuit being connected to said second node for connecting said second node to a third fixed-voltage in a first time period, in which said transfer clock signal is not supplied, and also for electrically isolating said second node from said third fixed-voltage in a second time period, in which said transfer clock signal is supplied.

4. The circuit as claimed in claim 3, wherein said voltage control circuit includes a capacitance connected in series between said second node and said second fixed-voltage supply line for fixing said second node in potential.

5. The circuit as claimed in claim 3, wherein said voltage control circuit further includes:

a voltage dividing circuit being connected in series between said first fixed-voltage supply line and said second fixed-voltage supply line;

a third node connected to an output terminal of said voltage dividing circuit; and a third enhancement type field effect transistor being connected in series between said second and third nodes, and said third enhancement type field effect transistor having a gate receiving a control signal under which said voltage control circuit is operated.

6. The circuit as claimed in claim 5, wherein said control signal comprises said transfer gate clock signal.

* * * * *